United States Patent
Shiraishi et al.

(12) 
(10) Patent No.: US 6,430,121 B1
(45) Date of Patent: Aug. 6, 2002

(54) DISC CHANGER CAPABLE OF SELECTING A MEDIUM FOR PLAYBACK AGAIN WITHIN A PRESCRIBED TIME

(75) Inventors: Yoshiki Shiraishi; Tatsuya Yanagisawa; Tadateru Honda; Morio Araki; Mitsuo Shoji, all of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/549,700

(22) Filed: Apr. 14, 2000

(30) Foreign Application Priority Data

Apr. 19, 1999 (JP) ............................................. 11-110297

(51) Int. Cl.[7] ................................................ G11B 17/22

(52) U.S. Cl. .................................... 369/30.28; 369/34.01

(58) Field of Search .............................. 369/30.28, 30.2, 369/30.29, 30.3, 30.06, 30.23, 30.27, 34.01

(56) References Cited

FOREIGN PATENT DOCUMENTS

JP                863869        *   3/1996  ............ 369/30.28

* cited by examiner

*Primary Examiner*—Tan Dinh
(74) *Attorney, Agent, or Firm*—Sughrue Mion, PLLC

(57) ABSTRACT

While a certain information-recorded medium is reproduced by a reproduction processing means of a reproduction apparatus, when the information-recorded medium is designated again within a prescribed time by a user through an operating means, the control means controls the reproduction processing means so that the pertinent information-recorded medium can be reproduced on the basis of the reproduction information stored in a storage means. In addition, when the pertinent information-recorded medium is designated again, the control means makes control of externally indicating whether or not the pertinent information-recorded medium should be reproduced on the basis of the reproduction information stored in the storage means. In this configuration, even when a user stops the reproduction processing by his erroneous operation while a certain information-recorded medium of a plurality of information-recorded media is reproduced he can return the reproduction apparatus to the processing of reproducing the pertinent information-recorded medium easily within a short time.

19 Claims, 4 Drawing Sheets

DISC CHANGER CAPABLE OF SELECTING A MEDIUM FOR PLAYBACK AGAIN WITHIN A PRESCRIBED TIME

BACKGROUND OF THE INVENTION

Field of the Invention

The present invention relates to a reproduction apparatus such as a multi-disk-player capable of selecting one of a plurality of information storage media and reproducing the selected medium.

A multi-disk player is known which can selectively one of a plurality of disks such as a CD (compact disk) and MD (minidisk).

In such a prior art, a plurality of disks (e.g. disk D1–D6) are housed in a magazine so that they can be withdrawn individually. With the magazine mounted in a multi-disk player, a desired piece of music on a desired disk can be selectively played by the operation from an operation panel.

The multi-task player, which has an advantage that it can save the labor of exchanging a disk by a user whenever playing of a certain disk is completed, is preferably used for a vehicle.

The multi-task player for a vehicle is installed within a limited space of a vehicle and the space is preferably minimized. For this reason, a player body is installed on a trunk room whereas an operation panel is installed in the vicinity of the dash board of a vehicle.

In the multi-disk player for a vehicle, a disk selecting button for selectively reproducing a housed disk and another button for selecting a certain piece of music within the disk are commonly formed by e.g. a crossing button as shown in FIG. 4 in order to minimize their occupied area on the operation panel.

FIG. 4 shows an operation panel used for an in-vehicle multidisk player. In FIG. 4, the crossing button 100 includes a pair of disk selecting keys 101a and 101b at its upper and lower ends. In this case, whenever a user depresses e.g. the disk selecting key 101a once, one of a plurality of disks housed in the magazine is continuously selected in an arrangement direction. On the other hand, whenever the user depresses the disk selecting key 101b once, one of the plurality of disks housed in the magazine is continuously selected in another arrangement direction.

The crossing button 100 includes a pair of music selecting keys 102a and 102b at its left and right ends. In this case, whenever a user depresses e.g. the music selecting key 102a once, each of a plurality of pieces of music housed in the disk now being selected is successively selected in a sequence reverse to numbers. On the other hand, whenever the user depresses the music selecting key 102b once, each of the plurality of pieces of music housed in the disk now being selected is successively selected in the sequence of the music numbers.

Therefore, if the user wants to listen to a desired piece of music from the desired disk using the crossing button 100, first, he depresses the disk selecting key 101a or 101b to select a desired disk. Thereafter, he depresses the music selecting key 102a or 102b to select the desired piece of music. Thus, the user can select the desired pieces of music included in the desired disk.

Using such a crossing button 100, the user can select the desired disk and desired piece of music on the operation panel having a limited space.

The operation panel includes in addition to the crossing button, a selecting button (FUNCTION) 103 which is a means for selecting the information medium into the medium to be reproduced, a power source switch (SOURCE) 104 which is means for detecting a power ON/OFF of the reproduction apparatus, etc.

The selecting button 103 is a switch for selecting the information medium. Whenever the user depresses the selecting button 103 once, he can sequentially select a plurality of disks housed in the magazine, AM broadcasting, FM broadcasting and cassette tape as an information medium to be reproduced. Incidentally, the crossing button 100 also serves to make frequency adjustment of a radio, station selection, sound quality and volume adjustment of music.

In the in-vehicle multidisk player, playing of each disk is executed by "autoplay". Now, it is assumed that the user turns ON the power switch 104. Then, when the multidisk player has been selected, it starts disk playing from the disk housed in the first tray of the magazine at a prescribed time after a microcomputer which is means for controlling the player detects ON of the power source.

Now it is assumed that the user wants to stop the disk playing. In this case, if the power source switch 104 is turned OFF, the microcomputer detects OFF of the power source to stop the disk playing. Thereafter, the disk is housed into the pertinent tray in the magazine and the player is placed in a stand-by state OFF of the power source.

In such an apparatus, for example, where the user wants to listen the fifth piece of music while the third piece of music of the disk D2 which is housed at the second position of the magazine is played, the user has only to depress the music selecting key 102b on the right side twice.

However, if the user erroneously operates the disk selecting key 101a or 101b at the upper end or lower end, the player will select the disk (e.g. disk D3) different from the disk being played at this time. Therefore, the user must select the original disk D2 (housed at the second position in the magazine) again by an additional operation for the disk selecting key 101a or 101b. In this case, the player plays the disk D2, but plays it from the first piece of music of the pertinent disk.

Therefore, where the user operates either the disk selecting key 101a or 101b for selecting the piece of music, he must select the desired disk D2 using the disk selecting key 101a or 101b again and further select the desired piece of music (e.g. fifth piece of music) using the music selecting key 101a or 102b. Thus, it takes a long time and excessive labor to play the desired piece of music.;

Further, during the music selecting operation, the user may erroneously depress the selecting button 103 or power switch 104 although he intends to depress the disk selecting key 101a or 101b.

Now it is assumed that the user erroneously depresses the selecting button 103 while the disk D2 is being played. In this case, even if the user selects the multidisk player using the selecting button 103, since the plurality of disks will be generally reproduced again from the first disk (e.g. disk D1), playing cannot be directly restored to the piece of music (third piece of music) of the disk D2 which has been reproduced immediately before the erroneous operation. Therefore, the user must select the disk D2 which has been reproduced immediately before by operating the crossing button 100 again.

Further, where the user has depressed the power switch 104 while the disk D2 is being reproduced, the power switch is turned off so that the reproduction of the disk is ceased at this time. Therefore, even if the user turns on the power using the power switch 104, since the plurality of disks will be generally reproduced again from the first piece of music of the first disk (e.g. disk D1), playing cannot be directly restored to the piece of music (third piece of music) of the disk D2 which has been reproduced immediately before the erroneous operation. Therefore, where the user wants to listen to the piece of music which has been reproduced immediately before the erroneous operation, the user must select the desired piece of music of the disk D2 by operating the crossing button 100 again.

Such an erroneous operation when operating the crossing button may occur when the user himself selects the desired piece of music while looking ahead during driving. If the user makes the above erroneous operation once during the driving, he must do the plural times of operations until he selects the desired piece of music which has been reproduced immediately before the erroneous operation. It takes labor and time for this purpose.

SUMMARY OF THE INVENTION

The present invention has been accomplished in order to solve the above problem.

An object of the present invention is to provide a reproduction apparatus which can restore to a reproduction operation of a certain information recording medium easily and quickly even when the reproduction of the pertinent medium of a plurality of recording information media is stopped due to an erroneous operation by a user while it is reproduced.

In order to attain the above object, in accordance with the first aspect of the invention, there is provided a reproduction apparatus capable of selectively reproducing a prescribed information-recorded medium of a plurality of information-recorded media, comprising:

operating means for receiving a selection command for the prescribed information-recorded medium;

selecting means for selecting the prescribed information-recorded medium on the basis of the selection command;

first reproduction processing means for making reproduction processing of the information-recorded medium thus selected;

storage means for storing reproduction information of the information-recorded medium being reproduced; and control means for controlling the selecting means and the reproduction processing means, wherein where an operation by the selecting means is executed while the reproduction processing means reproduces the prescribed information-recorded medium, if a selection command for the prescribed information-recorded medium is given again within a prescribed time by the operation, the control means instructs the selecting means to select the prescribed information-recorded medium again and instructs the reproduction processing means to reproduce the prescribed information-recorded medium on the basis of the reproduction information stored in the storage means.

In this configuration, for example, even when a user stops to reproduce the prescribed information-recorded medium owing to the user's command while the reproduction processing means reproduces the prescribed information-recorded medium, if the operating means receives a selection command for the prescribed information-recorded medium again within a prescribed time on the basis of a user's command, the control means instructs the selecting means to select the prescribed. information-recorded medium again and instructs the reproduction processing means to reproduce the prescribed information-recorded medium on the basis of the reproduction information stored in the storage means. Therefore, the reproduction apparatus can quickly make the reproduction processing of the prescribed information-recorded medium which has been reproduced immediately before the stopping.

Preferably, the reproduction apparatus according to the first aspect further comprises second reproduction processing means for reproducing prescribed information different from the first reproduction processing means and switching means for switching between the first reproduction processing means and the second reproduction processing means, wherein where a switching operation is made by the switching means is executed while the reproduction processing means reproduces the prescribed information-recorded medium, if the first reproduction processing is selected again within a prescribed time by the switching operation, the control means instructs the selecting means to select the prescribed information-recorded medium again and instructs the reproduction processing means to reproduce the prescribed information-recorded medium on the basis of the reproduction information stored in the storage means.

In this configuration, for example, even when a user makes an operation of switching the reproduction processing by the first reproduction processing means into that by the second reproduction processing means owing to a user's command while the first reproduction processing means reproduces a selected one of the information-recorded media, if the switching means makes an operation switching into the first reproduction processing means again within a prescribed time by the switching operation based on a user's command, the control means instructs the selecting means to select the prescribed information-recorded medium again and instructs the reproduction processing means to reproduce the prescribed information-recorded medium on the basis of the reproduction information stored in the storage means. Therefore, the reproduction apparatus can quickly make the reproduction processing of the prescribed information-recorded medium immediately before the stopping.

Preferably, the reproduction apparatus according to the first aspect further comprises:

detecting means for detecting ON/OFF of a power source, wherein where OFF of the power source is detected by the detecting means while the first reproduction processing means reproduces the prescribed information-recorded medium, if ON of the power source is detected again within a prescribed time, the control means instructs the selecting means to select the prescribed information-recorded medium again and instructs the first reproduction processing means to reproduce the prescribed information-recorded medium on the basis of the reproduction information stored in the storage means.

In this configuration, for example, even when a user turns off the power source while the first reproduction processing means reproduces a selected one of the information-recorded media, if the power source is turned on again within a prescribed time, the detecting means detects "ON" of the power source before the prescribed time elapses. In this case, the control means instructs the selecting means to select the prescribed information-recorded medium again and instructs the first reproduction processing means to reproduce the prescribed information-recorded medium on the basis of the reproduction information stored in the storage means. Thus, the reproduction apparatus can quickly make the reproduction processing of the prescribed information-recorded medium which has been reproduced immediately before the power source is turned OFF.

In the reproduction apparatus according to the first aspect, preferably, the reproduction information stored in the storage means is address information indicative of an address position of the prescribed information-recorded medium.

In this configuration, for example, even when a user stops to reproduce the prescribed information-recorded medium owing to the user's command while the reproduction processing means reproduces the prescribed information-recorded medium, since the address information of the information-recorded medium which has been reproduced immediately before stopping is stored for a prescribed time in the storage means, if the control means issues a command of reproducing the prescribed information-recorded medium within the prescribed time, the control means can control the first reproduction processing means to reproduce the prescribed information-recorded medium from the address position immediately before stopping. Thus, the reproduction apparatus can quickly resume the reproduction processing from the address position immediately before stopping.

In the reproduction apparatus according to the first aspect, preferably, the reproduction information stored in the storage means is address information indicative of a leading address position of a predetermined group of the information-recorded media.

In this configuration, for example, even when a user stops to reproduce the prescribed information-recorded medium owing to the user's command while the reproduction processing means reproduces a group of the prescribed information-recorded medium, since the leading address information of the group of the information-recorded medium which has been reproduced immediately before stopping is stored for a prescribed time in the storage means, if the control means issues a command of reproducing the prescribed information-recorded medium within the prescribed time, the control means can control the first reproduction processing means to reproduce the prescribed information-recorded medium from the leading address position of the group immediately before stopping. Thus, the reproduction apparatus can quickly resume the reproduction processing from the leading address position of the group immediately before stopping.

In accordance with the second aspect of the present invention, there is provided a reproduction apparatus capable of selectively reproducing a prescribed information-recorded medium of a plurality of information-recorded media, comprising:

operating means for receiving a selection command for the prescribed information-recorded medium;

selecting means for selecting the prescribed information-recorded medium on the basis of the selection command;

first reproduction processing means for making reproduction processing of the information-recorded medium thus selected;

storage means for storing reproduction information of the information-recorded medium being reproduced; and control means for controlling the selecting means and the reproduction processing means, wherein where an operation by the selecting means is executed while the reproduction processing means reproduces the prescribed information-recorded medium, if a selection command for the prescribed information-recorded medium is given again within a prescribed time by the operating means, the control means externally informs whether or not the prescribed information-recorded medium should be reproduced on the basis of the reproduction information stored in the storage means.

In this configuration, for example, even when a user stops to reproduce the prescribed information-recorded medium owing to the user's command while the reproduction processing means reproduces the prescribed information-recorded medium, if a selection command for the prescribed information-recorded medium is issued again within a prescribed time through an operation by an operating means, the control means externally informs whether or not the prescribed information-recorded medium should be reproduced on the basis of the reproduction information stored in the storage means. As a result, the user can decide quickly whether or not the reproduction apparatus should be restored to the reproduction processing of the prescribed information-recorded medium before stopping.

Preferably, the reproduction apparatus according to the second aspect of the present invention further comprises second reproduction processing means for reproducing prescribed information different from the first reproduction processing means and switching means for switching between the first reproduction processing means and the second reproduction processing means, wherein where a switching operation is made by the switching means is executed while the reproduction processing means reproduces the prescribed information-recorded medium, if the first reproduction processing is selected again within a prescribed time by the switching operation, the control means informs externally to the reproduction apparatus whether or not the prescribed information-recorded medium should be reproduced on the basis of the reproduction information stored in the storage means.

In this configuration, for example, even when a user makes an operation of switching the reproduction processing by the first reproduction processing means into that by the second reproduction processing means owing to a user's command while the first reproduction processing means reproduces a selected one of the information-recorded media, if the switching means makes an operation switching into the first reproduction processing means again within a prescribed time by the switching operation based on a user's command, the user can decide quickly whether or not the reproduction apparatus should be restored to the reproduction processing of the prescribed information-recorded medium before stopping.

Preferably, the reproduction apparatus according to the second aspect further comprises:

detecting means for detecting ON/OFF of a power source, wherein where OFF of the power source is detected by the detecting means while the first reproduction processing means reproduces the prescribed information-recorded medium, if ON of the power source is detected again within a prescribed time, the control means instructs the selecting means to select the prescribed information-recorded medium again and instructs the first reproduction processing means to reproduce the prescribed information-recorded medium on the basis of the reproduction information stored in the storage means.

In this configuration, for example, even when a user turns off the power source while the first reproduction processing means reproduces a selected one of the information-recorded media, if the power source is turned on again within a prescribed time, the detecting means detects "ON"

of the power source before the prescribed time elapses. In this case, the control means instructs the selecting means to select the prescribed information-recorded medium again and informs externally to the reproduction apparatus whether or not the prescribed information-recorded medium should be reproduced on the basis of the reproduction information stored in the storage means. As a result, the user can decide quickly whether or not the reproduction apparatus should be restored to the reproduction processing of the prescribed information-recorded medium immediately before the power source is turned OFF.

The reproduction apparatus according to the second aspect of the invention further comprises:

input means for inputting a selecting command of information informed externally to the reproduction apparatus, wherein where the input means selects to reproduce the prescribed information-recorded medium on the basis of the reproduction information stored in the storage means, the control means instructs the selecting means to select the prescribed information-recorded medium again and instructs the first reproduction processing means to reproduce the prescribed information-recorded medium on the basis of the reproduction information stored in the storage means.

In this configuration, for example, even when a user stops to reproduce the prescribed information-recorded medium owing to the user's command while the reproduction processing means reproduces the prescribed information-recorded medium, if the reproduction of the prescribed information-recorded medium is selected by the input means, the control means instructs the selecting means to select the prescribed information-recorded medium again and instructs the reproduction processing means to reproduce the prescribed information-recorded medium on the basis of the reproduction information stored in the storage means. Thus, the user can quickly restore the reproduction apparatus to the reproduction processing of the prescribed information-recorded medium on the basis of the reproduction information stored in the storage means.

Preferably, where the input means selects to not reproduce the prescribed information-recorded medium on the basis of the reproduction information stored in the storage means, the control means instructs the selecting means to select the prescribed information-recorded medium again and instructs the first reproduction processing means to make normal reproduction processing.

In this configuration, for example, even when a user stops to reproduce the prescribed information-recorded medium owing to the user's command while the reproduction processing means reproduces the prescribed information-recorded medium, the user can quickly restore the reproduction apparatus to the normal reproduction processing of the prescribed information-recorded medium on the basis of the reproduction information stored in the storage means.

In the reproduction apparatus according to the second aspect, preferably, the reproduction information stored in the storage means is address information indicative of an address position of the prescribed information-recorded medium.

In this configuration, where the prescribed information-recorded medium is selected again within a prescribed time by the selecting means, the control means instructs the selecting means to select the prescribed information-recorded medium again and instructs the reproduction processing means to reproduce the prescribed information-recorded medium on the basis of the address information stored in the storage means. As a result, the user can restore quickly the reproduction apparatus to the reproduction processing of the prescribed information-recorded medium based on the address information stored in the storage means.

Preferably, the reproduction information stored in the storage means is address information indicative of a leading address position a predetermined group of the information-recorded media.

In this configuration, where the prescribed information-recorded medium is selected again within a prescribed time by the selecting means, the control means instructs the selecting means to select the prescribed information-recorded medium again and instructs the reproduction processing means to reproduce the prescribed information-recorded medium on the basis of the leading address information stored in the storage means. As a result, the user can restore quickly the reproduction apparatus to the reproduction processing of the prescribed information-recorded medium based on the leading address information stored in the storage means.

The above and other objects and features of the present invention will be more apparent from the following description taken in conjunction with the accompanying drawings.

DESCRIPTION OF THE PREFERRED EMBODIMENTS

Now referring to FIGS. 1 to 4, an explanation will be given of a preferred embodiment of the present invention.

Figure 1:
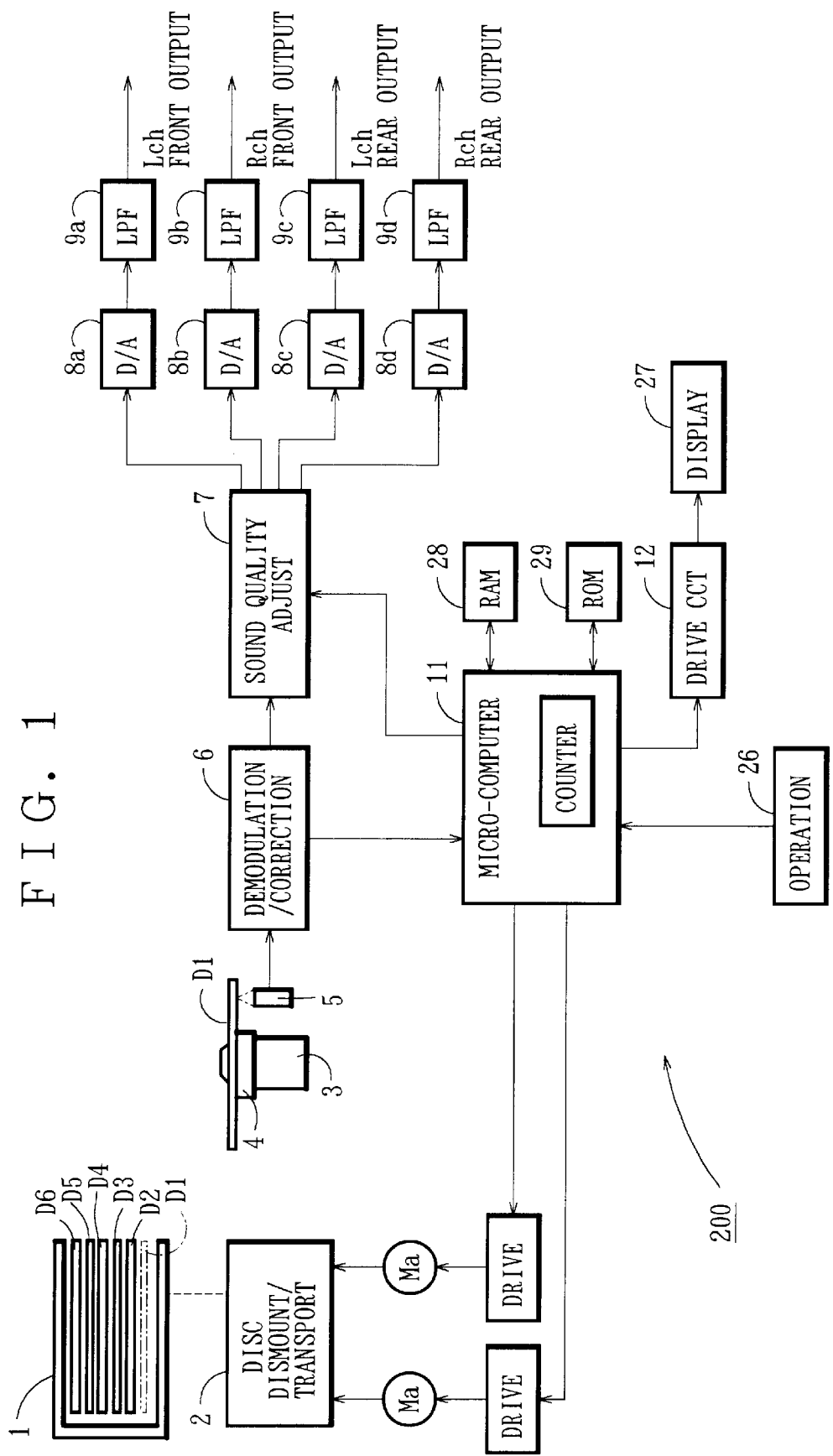
FIG. 1 is a schematic diagram showing a reproduction apparatus according to an embodiment of the present invention.

FIG. 1 is a schematic diagram showing a reproduction apparatus according to an embodiment of the present invention.

As seen from FIG. 1, a reproduction apparatus 200 includes an operation means 26 which is operated by a command from a user, a microcomputer 11 which is a means for controlling individual components of the apparatus, a RAM 28 and a ROM which are storage means, a reproduction means for reproducing a plurality of disks serving as a plurality of information recording media. The reproduction means includes a disk transporting mechanism 2, a spindle motor 3, a turn table 4, a motor Ma, a motor Mb, a pick-up 5, a demodulating/collecting circuit 6, a sound quality adjusting circuit 7, D/A converters 8a to 8d, and LPFs (low-pass filters) 9a to 9d.

The reproduction apparatus 200 also includes another reproduction means for reproducing different items of prescribed information (e.g. information from an AM broadcasting, M broadcasting, cassette tape, etc.) which are different from the disks serving as a plurality of information recording media housed in the magazine 1.

The reproduction apparatus 200 includes a display 27 for making several kinds of indications and a driving circuit 12 for driving the display.

In FIG. 1, the magazine has six trays (not shown) carrying disks D1 to D6 serving as information media, respectively which are arranged at a prescribed pitch. The trays are arranged in the magazine so that they can be protruded from and received in a magazine body. The magazine 1 is removably mounted in a prescribed portion of the reproduction apparatus 200.

The reproduction apparatus 200 is a player which can make continuous playing (in which a plurality of disks are continuously played), programmed playing (in which they are played in a previously selected order) or random playing (in which a certain piece of music is freely selected according to random numbers) with a plurality of disks (e.g. disks D1 to D6) housed in the magazine. By operating a switching button 103 attached to the operation means, the reproduction apparatus 200 is adapted to reproduce prescribed information (e.g. information from an AM broadcasting, FM broadcasting, cassette tape) by switching between the means for reproducing the plurality of disks and another means for reproducing the prescribed information.

The operating means 26 is composed of the same several kinds of operation buttons as those attached to the operation panel of the conventional multidisk player described above.

Namely, the operation panel includes a pair of disk selecting keys 101a, 101b and a pair of music selecting keys 102a, 102b which are included in the crossing button 100, a switching button 103, a power source switch 104, etc.

The operation panel, in addition to the above crossing button 100, switching button and power switch 104 serving as a means for detecting the on/off of the power of the reproduction apparatus, further includes a title input key (not shown) for instructing the title of a disk to be inputted, and an alphabet key or "katakana" key for inputting characters of the title, which are operated on the basis of instructions by the user.

Like the above various kinds of command keys, the operation means 26 is connected to the microcomputer 11 and receives a selecting command for selectively designating any one of the plurality of disks D1 to D6 housed in the magazine by the user's operation.

For example, the disk carried by the magazine is designated by designating the position (e. g. tray number) of the tray housed in the magazine.

By selecting one of the six trays within the magazine 1 on the basis of the selecting command, the microcomputer 11 serving as the selecting means selects the disk carried by the tray.

The disk selected by the microcomputer 11 will be subjected to the reproduction by the reproducing means as follows.

By a disk extracting/transfer mechanism 2 under the control by the microcomputer 11, the selected disk on the tray is extracted, transferred onto the turn table 4 attached to a rotary shaft of a spindle motor 3 and clamped there.

The disk extracting/transfer mechanism 2 includes a pushing member (not shown) for protruding the tray in the magazine and shifting it onto the turn table 4, a clamping mechanism (not shown) for clamping the disk when it has been shifted onto the turn table 4, a shifting plate (not shown) for changing the relative position of the pushing member to the magazine 1 in an arrangement direction of the disks housed in the magazine, and a sensor for detecting the operation of the position of the shifting plate and the operation of the clamping mechanism. In the disk extracting/transfer mechanism 2, the shifting plate and pushing member are driven by the motors Ma and Mb, respectively so that, after the shifting plate is moved to position the pushing member so as to face the tray opposite to a desired disk, the pushing member is driven to push the tray, thereby extracting the disk on the tray. The structure of these magazine and disk extracting/transfer mechanism 2 is disclosed in JP-A-62-14369.

The information recorded on the disk which is rotatively driven by the spindle motor 3 is read by the pick-up 5. The RF signal thus read is demodulated and error-corrected by the demodulation/correction circuit 6 to provide a digital audio signal. The digital audio signal is supplied to the sound quality adjusting circuit 7. The sound quality adjusting circuit 7 includes a DSP (digital signal processor) (not shown) and an external RAM (not shown) connected thereto.

On the other hand, the microcomputer 11 creates sound field data (data for adjusting the sound quality, volume and phase difference of the audio signal to be supplied to each speaker) according to the user's operation of a sound field adjusting key and supplies it to the sound quality adjusting circuit 7 as occasion demands.

The digital audio signal supplied to the sound quality adjusting circuit 7 is subjected to the conversion processing according to the sound field data. The digital audio signals thus obtained are supplied to D/A converters 8a to 8d as a front and a rear output for each of left and right channels (Lch and Rch). The analog audio signals converted from the digital audio signals are outputted through LPFs (low-pass-filters) 9a to 9d. The respective audio signals are reproduced by front and rear speakers (not shown) for each of the left and right channels. It should be noted that the demodulating/correction circuit 6 supplies the sub-code signal including TOC (Table of Contents) information to the microcomputer 11.

The reproduction processing means reproduces the disk selected by the microcomputer 11.

The microcomputer 11 is connected to a RAM 28 serving as storage means and a ROM for storing display pattern data of the character such as an alphabet and "katakana".

The RAM 28 has a display data storing area for temporarily storing the information data relative to the plurality of disks in the magazine 1. Under the control by the microcomputer 11, the display data recording area stores a title data TTL (n) indicative of the character of the title of a disk and a track data TCK (n) indicative of the track number of the disk (n) according to the disk number data indicative of the title number n (n: integer of 1 to 6) of the disk.

The title data TTL (n) are temporarily stored for each disk in the display data recording area in such a manner that when the user operates the alphabet key or "katakana" key provided on the operation panel by the user, the microcomputer 11 selects the data corresponding to the display character of the title from the display pattern data of each character stored in the ROM 29 and transfers it to the RAM 28.

The RAM 28 has also a reproduction information recording area for storing the reproduction information of the disk now being reproduced, i.e. disk number data, track number data, address data being read by the pickup 5, sound field data being converted by the sound quality adjusting circuit 7, etc. for a prescribed time under the control by the microcomputer 11.

The microcomputer 11 is connected to the display 27 through the driving circuit 12. The display 27 maybe a display of a dot display format, e.g. liquid crystal display arranged on the operation panel.

The driving circuit 12 includes a memory (not shown) having storage positions corresponding to all the dots of the display 27. Therefore, since the display pattern data supplied from the microcomputer 11 are stored in the memory, the pattern such as the title character represented by the display pattern data is displayed on the display device 27.

Additionally, the microcomputer 11 also supplies to the driving circuit 12 a command of displaying a display area on the display device 27 as well as the disk number data, title data TTL (n) for each disk number and the track data TCK (n) indicative of the track number of each disk which are temporarily stored in the display data recording area of the RAM.

The display area is an area on which the titles of the respective disks are displayed in an at-a-glance chart. The display area is composed of title write-in columns A(1)–A(6) and track number display columns B(1)–B(6) which are arranged so as to correspond to the disk number.

The reproduction apparatus 200 is structured as described above. Where the user wants to listen to the desired number of the desired disk from the plurality of disks within the magazine 1, the user switches the operation to the reproduction processing of the plurality of disks housed in the magazine I using the switching button 103, depresses one of the disk selecting keys (101a, 101b) arranged on the crossing button 100 to select a desired disk, depresses on of the piece of music selecting keys (102a, 102b) to select a desired piece of music. Thus, the user can listen to the desired piece of music of the desired disk.

While a certain piece of music of a certain disk is reproduced by the reproduction apparatus 200, where the user wants to listen to another piece of music of the pertinent disk, the user can depress the music selecting key 102a or 102b as necessary to switch the reproduction into that of a desired piece of music so that the user can listen to the desired piece of music.

Further, the user wants to reproduce the other information medium(e.g. AM broadcasting, FM broadcasting, cassette tape, etc.), which is reproducibly connected to the reproduction apparatus 200, he can operates the switching button (FUNCITION) as necessary to switch the reproduction into that of an information medium, thus reproducing the desired information medium.

In accordance with this embodiment, even when the user erroneously depresses either one of the disk selecting keys (101a, 10b) of the crossing button 100 while a certain piece of music of a certain disk is reproduced by the reproduction apparatus 200, if the user can designate the pertinent disk again within a prescribed time from the erroneous operation, the microcomputer 11 can select the pertinent disk and control the reproducing means so that it reproduce the pertinent disk on the basis of the reproduction information stored in the RAM 28. This is because the RAM 28 is controlled so that the reproduction information of the disk which has been reproduced immediately before the erroneous operation is stored only within a prescribed time.

Figure 2:
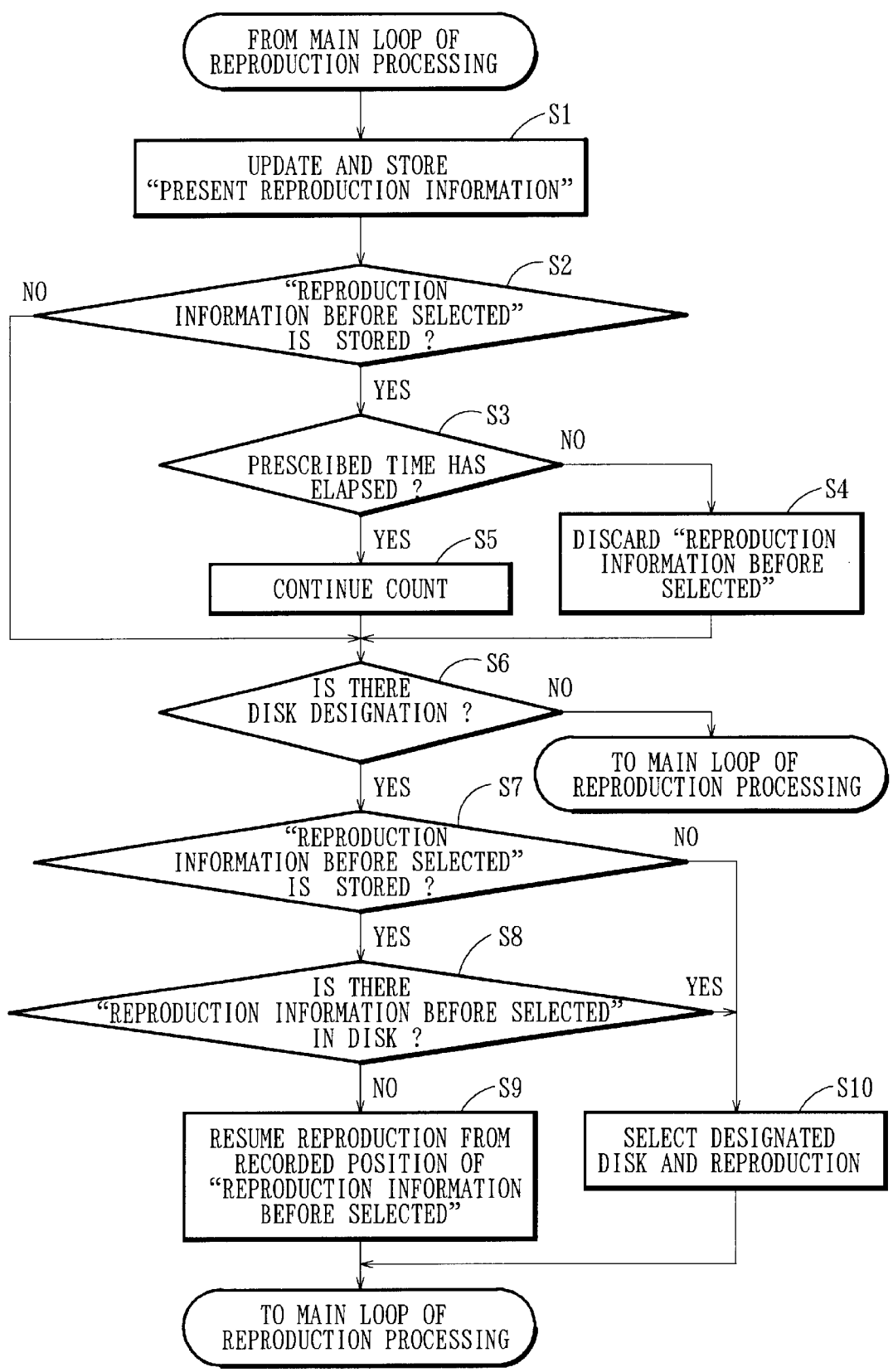
FIG. 2 is a flowchart showing the control operation of a microcomputer.

FIG. 2 is a flowchart showing the control operation of the microcomputer 11. This flowchart is a sub-routine of the control operation (main loop) of the microcomputer 11 when the reproduction processing means of the reproduction apparatus 200 performs a reproduction operation.

First, in step S1, the microcomputer 11 detects the sub-code signal supplied from the demodulating/correction circuit 6 once every 10 msec while the reproduction processing means reproduces a certain disk, thereby sequentially detecting the reproduction information of the pertinent disk. This information is supplied to the RAM 28 as present reproduction information while a certain music of the pertinent disk is reproduced by the reproduction apparatus 200. The RAM 28 updates the present reproduction information every time it is supplied. For example, if the third piece of music of disk D2 housed in the magazine 2 is reproduced, the address data of the third piece of number of the disk D2 which is obtained from the sub-code signal now being detected (i.e. address information indicative of the present address position information) is stored in the RAM 28 as the present reproduction information. The present information is updated whenever the reproduction proceeds.

The present reproduction information can be stored for each piece of music. Specifically, if the third piece of music is being reproduced, the leading address information indicative of the leading address position of the third piece of music is stored as the present reproduction information. When the reproduction is shifted to that of a next piece of music, the leading address information of the fourth piece of music is stored as the present reproduction information. Where the data are classified into prescribed groups, the leading address information indicative of the leading address position of the pertinent group can be stored as the present reproduction information.

The processing by the microcomputer 11 proceeds to step S2. In step S2, it is determined whether or not the reproduction information before selection has been stored in the reproduction information recording area. If not stored, the processing proceeds to step S6.

The case where the reproduction information before selection is not stored includes for example, the cases where a certain disk is being reproduced over a prescribed time by the reproducing means, and where an engine key has been just depressed.

The reproduction information before selection refers to the reproduction information of a certain disk which is detected by the reproduction processing immediately before the operation of the operation means 26 or switching button 103 performed by a user while a certain piece of music of a certain disk is being reproduced.

On the other hand, if the microcomputer 11 determines that the reproduction information before selection is stored in the reproduction information recording area of the RAM 28, the processing proceeds to step S3. In step S3, the microcomputer 11 determines whether or not the storing time of the RAM 28 has exceeded a prescribed time (e. g. 20 sec). This is carried out according to whether or not the counter of the microcomputer 12 is making a counting operation.

If the microcomputer 11 determines in step S3 that the prescribed time (now 20 sec) has elapsed, the processing proceeds to step S4. Instep S4, the microcomputer 11 controls the RAM 28 so that it discards or cancels the stored reproduction information before selection. The processing proceeds to step S6.

This is based on the following reason. After the user has made the operation means 26 or switching button 103, he does not repeat the operation thereof. In this case, assuming that the user has made his intended operation after the reproduction information before selection has been stored for a prescribed time, the reproduction information before selected is discarded.

If the microcomputer 11 determines in step S3 that the prescribed time has not yet elapsed, the processing proceeds to step S5. In step S5, the microcomputer 11 controls thecounter to continue its counting operation. The processing proceeds to step S6.

In step S6, the microcomputer 11 detects whether or not the operation of designating the disk has been made by any of the disk selecting keys (101a, 101b). If not, the processing returns to the main loop of the reproduction processing.

In step S6, if the microcomputer 11 detects that the operation of designating the disk has been made, the processing proceeds to step S7.

In step S7, the microcomputer 11 determines whether or not the reproduction information before selection is stored in the reproduction information recording area of the RAM 28. If not, the processing proceeds to step S10.

This means that the counter of the microcomputer 11 is not making the counting operation. This. applies to the cases where the reproduction information has not already been stored in the RAM 28 when the user makes the operation of designating the disk (NO in step S2) and the RAM 28 is controlled to discard the stored reproduction information before selection (step S4 has been executed).

On the other hand, in step S7, if the microcomputer 11 determines that the reproduction information before selection is stored in the reproduction-information recording area of the RAM28, the processing proceeds to step S8.

This is the case where the reproduction information before selection is stored in the RAM 28 (Yes in step S7) while the counting operation by the counter is continued (step S5) at the time when the user designates the disk in step S6.

In step S8, the microcomputer 11 determines whether or not the disk designated in step S6 has the reproduction information before selection now being stored in the RAM 28. If NO, the processing proceeds to step S10.

This is the case where in step S6, the user designates another disk different from the disk having been being reproduced immediately before the disk designating operation.

In step S10, the microcomputer 11 selects the disk designated in previous step S6 (inclusive of the disk having been being reproduced immediately before the disk designating operation). Thereafter, the microcomputer 11 starts to the reproduction from the first piece of music of the pertinent disk and stores in the RAM 28 as "the reproduction information before selection" the present reproduction information when the first piece of music of the disk is reproduced and at the same time resets the counter to start the counting of a prescribed time (e.g. 20 sec). In this way, the microcomputer 11 makes the control of sequentially supplying the reproduction information now being reproduced as the present reproduction information in the RAM 28, and thereafter the processing proceeds to the main loop of the reproduction processing.

This is the case when the user designates the disk (Yes in step S6), the reproduction information before selection has not been stored in the RAM (No in step S7), or the user designates another disk although it has still been stored. In these cases, the microcomputer 11 makes the control of reproducing the first piece of music of the disk designated by the user.

On the other hand, in step S8, where the disk designated by step S6 has the reproduction information before selection now being stored in the RAM, the processing proceeds to step S9. In step S9, the microcomputer 11 starts the reproduction from the information recording position corresponding to the reproduction information before selection. Thereafter, the processing returns to the main loop of reproduction.

This is the case where the user designates again the disk which has been being reproduced immediately before the disk designating operation in a state where the reproduction information before has been still stored in the RAM 28. In this case, the microcomputer 11 makes the control of reproducing the disk designated by the user on the basis of the reproduction information before selection.

As understood from the above description, even when the reproduction of a certain disk is stopped because the user erroneously operates the reproduction apparatus while the disk is reproduced, if the user designates the pertinent disk again within a prescribed time (now, within 20 sec) the microcomputer 11 selects the pertinent disk to make control so that the reproduction processing means reproduces the pertinent disk on the basis of the reproduction information stored in the RAM 28. Thus, the reproduction apparatus reproduces the disk quickly immediately before the erroneous operation.

Additionally, the reproduction apparatus can alter the reproduction starting position of the disk immediately before the erroneous operation. Specifically, when the user previously designates the reproduction starting position of the disk (e.g. head or some midpoint of a piece of music), the microcomputer 11 makes the control of starting the reproduction from the designated reproduction starting position.

Incidentally, the embodiment described above has been explained for the case where even when the reproduction of a certain disk is stopped because the user erroneously operates the reproduction apparatus while the disk is reproduced, if the user designates the pertinent disk again within a prescribed time (now, within 20 sec) the microcomputer 11 selects the pertinent disk to make control so that the reproduction processing means reproduces the pertinent disk. However, the present invention should not be limited to such a case, for example the case where the microcomputer 11 alerts externally to the reproduction apparatus whether or not the reproduction of the disk should be made where the user has designated the disk within a prescribed time. Such a control by the microcomputer 11 is shown in the flowchart of FIG. 3.

Figure 3:
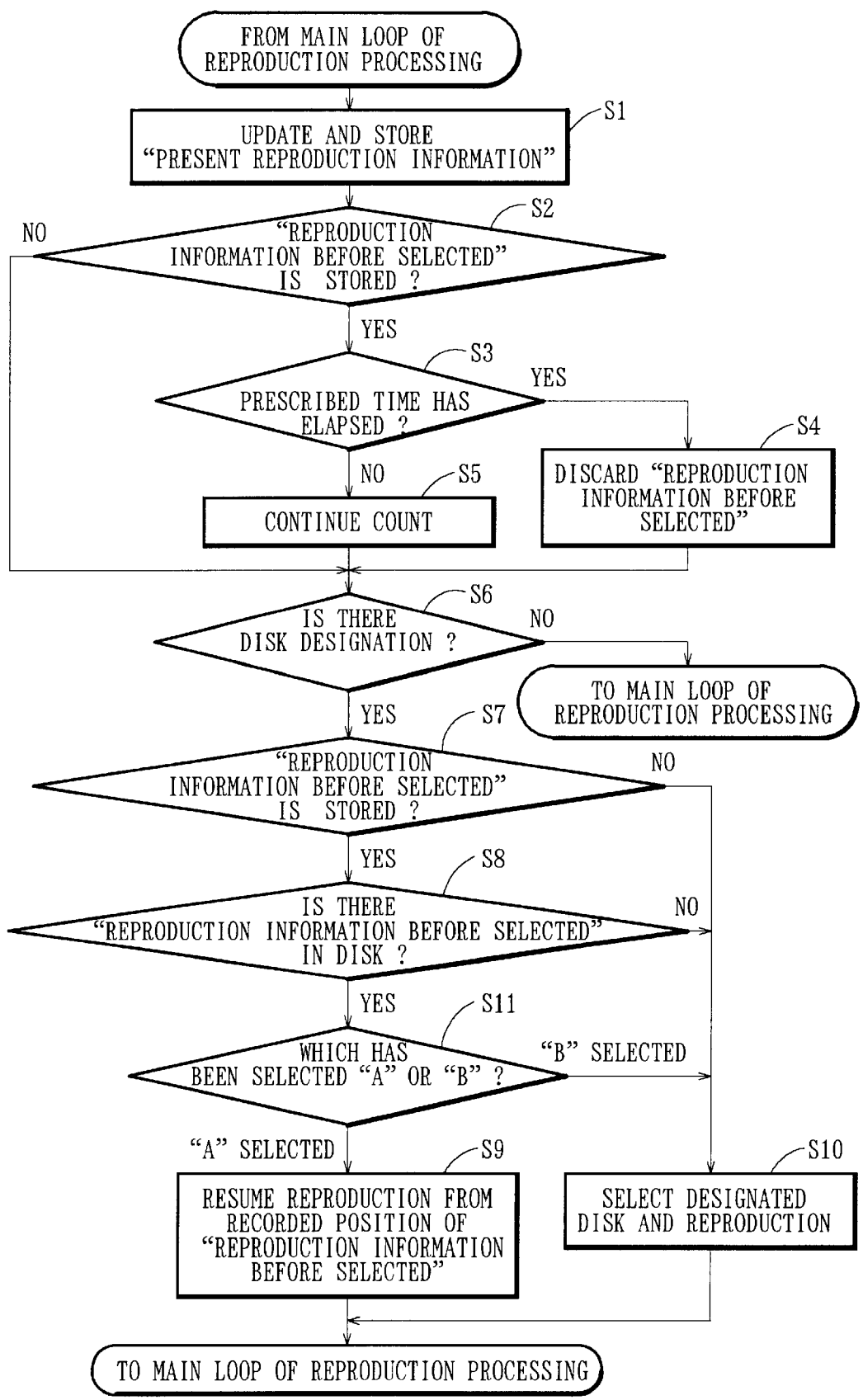
FIG. 3 is a flowchart showing the other control operations of the microcomputer.
Figure 4:
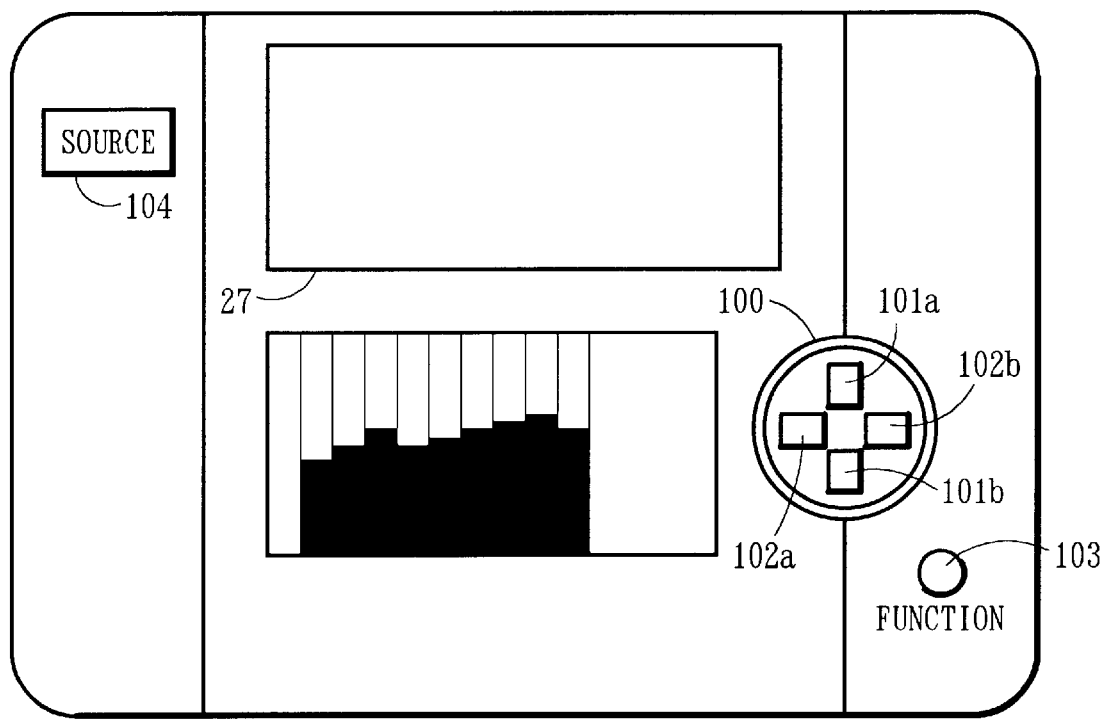
FIG. 4 is a plan view of an operation panel used for a conventional in-vehicle multidisk player.

FIG. 3 is a flowchart showing such a control operation of the microcomputer 11. Like the case of FIG. 2, this flowchart is also a sub-routine of the control operation (main loop) of the microcomputer 11 when the reproduction processing means of the reproduction apparatus 200 performs a reproduction operation.

The flowchart of FIG. 3 includes an addition of step S11 to that of FIG. 2. The respective steps of Si to S10 are the same as those of FIG. 2. Therefore, now, the steps of S1–S7 will not be explained and only the steps of step S8 et seq. will be explained below.

In step S8 of FIG. 3, the microcomputer 11 determines whether or not the disk designated in step S6 has the reproduction information before selection now being stored in the RAM 28. Where it does not have the reproduction information before selection, the processing proceeds to step S10.

In step S10, the microcomputer 11 make the same control operation as step S10 in the flowchart of FIG. 2. The processing returns to the main loop of the reproduction processing.

On the other hand, in step S8, if YES, i.e. the microcomputer 11 determines that the disk designated by step S6 has the reproduction information before selection now being stored in the RAM 28, the processing proceeds to step S11.

In step S11, the microcomputer 11 makes the control of externally informing whether the disk designated by step S6 should be reproduced from the information recording position corresponding to the reproduction information before selection (A) or it should be normally reproduced (B).

Specifically, the microcomputer 11 selects a display character (character string of "A" and "B") necessary for informing from display pattern data of each of the characters stored in the ROM 29 and supplies it to the driving circuit 12. The driving circuit 12 writes the display pattern data supplied from the microcomputer 11 into the memory, thereby externally informing the fact displayed on the display 27.

In step S11, the microcomputer 11 determines which of informed selection commands has been selected. In this case, the microcomputer 11 makes the determination in such a way that it detects which of "A" and "B" corresponding to the selection has been selected by the user using the button (not shown) serving as the input means arranged on the operation panel.

Where the microcomputer 11 detects that "A" has been selected using the button, the processing proceeds to step S9.

Where the microcomputer 11 detects that "B" has been selected using the button, the processing proceeds to step S10.

Specifically, in step S11, when the user is informed by the display 27, he determines whether the reproduction of the disk should be started from the information recording position based on the reproduction information before selection stored in the RAM 28 or the reproduction should be made by the normal reproduction processing. For example, where he wants to continue the reproduction of the disk from the information recording position immediately before the erroneous operation, he makes the selecting operation of the operation panel to make a control to start the reproduction processing from the information recording position corresponding to the reproduction information before selection. Thereafter, the processing is returned to the main loop.

Where the user wants to listen to the designated disk from the start, he selects the above "B". When the microcomputer 11 detects this, the processing proceeds to step S10. Thus, after the designated disk is selected, the microcomputer 11 makes the reproduction processing from the first piece of music of the pertinent disk and at the same time resets the counter. In addition, the microcomputer makes the control of sequentially supplying the reproduction information now being reproduced to the RAM 28. The processing is returned to the main loop.

As understood from the description hitherto made, even when the user stops the reproduction of the disk owing to his erroneous operation for the reproduction apparatus, if the user designates the pertinent disk within a prescribed time (now 15 sec), the microcomputer 11 selects the pertinent disk to inform externally through the display 27 whether the disk should be reproduced from the information recording position immediately before the erroneous operation or reproduced from the start.

After informed, the user can determine whether the pertinent disk should be reproduced on the basis of the reproduction information stored in the RAM 28 using the button serving as the input means or the disk should be listened from the start.

In this embodiment, although the display on the operation panel is used as the informing means, sound may be used instead. Further, after informed, after the selecting operation is performed using the button arranged on the operation panel, the reproduction apparatus can make the processing through sound recognition.

In this embodiment, in step S11, two selecting commands are processed. However, with only one command being displayed, according to whether or not its selection is designated within a prescribed time, the processing may be shifted to the one processing or the other processing.

In this embodiment, although an explanation has been given of the case where the user has erroneously depressed either one of the disk selecting keys (101a, 101b) of the crossing button 100, the present invention should not be limited to such a case, but can be applied to other cases.

Specifically, it is now assumed that the user erroneously depress the switching button 103 to switch the operation into the reproduction of the other information medium. In this case also, if the microcomputer 11 is adapted to make the same control operation as that (FIG. 2 or 3) in the embodiment described above within a prescribed time, it makes the control so that the RAM 28 stores the reproduction information of the disk which has been reproduced immediately before the erroneously operation only within a prescribed time. Thus, if the user could select a plurality of disks again using the switching button within a prescribed time elapsed from the timing of the erroneous operation, the microcomputer 11 can control the reproducing processing means so that it switches the reproduction processing of the information medium into the reproduction of the plurality of disks, and reproduces the pertinent disk on the basis of the reproduction information stored in the RAM 28. This may be applied to the case of informing processing.

Further, even when the user erroneously turns off the power switch 104 while a certain piece of music of a certain disk is reproduced, if the microcomputer 11 makes the same control operation (FIGS. 2 and 3) as that in the above embodiment is carried out within a prescribed time, it can control the reproducing means so that the RAM 28 stores the reproduction information of the disk which has been reproduced immediately before the erroneous operation only for a prescribed time. As a result, if the user turns on the power switch 104 within the prescribed time again, the microcomputer 11 can detect this to select the disk which has been reproduced immediately before the erroneous operation and controls the reproduction processing means to reproduce the pertinent disk on the basis of the reproduction information stored in the RAM 28. This may be applied to the informing processing.

In the above embodiment, an explanation has been given of the case where when the user has stopped the reproduction of the disk by his erroneous operation for the reproduction apparatus while the reproducing apparatus reproduces a certain disk, he designates the pertinent disk again within a prescribed time using a selecting key as the operating means so that the pertinent disk is reproduced. However, for example, a reproduction restoring button as the operating means may be arranged on the operating panel so that the user depresses the reproduction restoring button instead of the disk selecting key within a prescribed time. In this case, where the microcomputer 11 detects that the reproduction restoring button has been depressed, it can select the pertinent disk using the information (e.g. TOC (Table of Contents) information) for identifying the disk.

In the embodiment, an explanation has been given of the case where a plurality of information recording media housed in the reproduction apparatus are CDs dedicated to music. The plurality of information media which can be employed in the present invention should not be limited to the above CDs. They may be MD (minidisk), DVD, CD-R, CD-ROM, etc. and a combination thereof. For example, were the information recording medium is DVD, the reproduction information to be stored in the storage means includes, in addition to the reproduction information in the embodiment, a title/chapter number, cell number, address indicative of NAVI pack, angle number, parental level, audio stream number, sub-pict stream number, aspect ratio/screen mode, etc.

Where the storage means stores these items as reproduction information, the user can see the same title on the basis of the title/chapter number, see the same image scene on the basis of the cell number or the address indicative of NAVI pack, see the image from the same angle on the basis of the angle number, see the image under the same viewing limitation on the basis of the basis of the parental level, and listen to the sound such as the same audio language on the basis of the audio stream number, see the image such as the same subtitle language on the basis of the sub-pict stream number, and see the image at the same screen ratio on the basis of the aspect rate/screen mode.

In the embodiment described above, the operating means is constructed of the crossing button 100 having a pair of disk selecting keys 101a and 101b provided on the operating panel. However, the operating means employed in the present invention may be a remote control key, a touching panel key, a soft key such as a pointing device, or an audio input means.

In the embodiment described above, whether or not the pertinent information recording medium on the basis of the reproduction information stored in the storage means (RAM 28) should be reproduced was noticed in a string of characters displayed externally by the driving circuit 12 and display 27. However, in the present invention, it may be carried out using warning sound by predetermined signal sound and voice which are obtained when the audio signals outputted through the LPFs (low-pass filter) 9a–9d are supplied to a speaker.

In the embodiment described above, the microcomputer 11 causes the storage means (RAM) 28 to store the reproduction information before selection for a prescribed time. Further, after a new disk is erroneously designated (or switching button is switched) within the prescribed time, when the disk reproduced immediately before the erroneous operation is designated (or switching button is switched) again, the microcomputer 11 starts the reproduction processing based on the reproduction information stored in the storage means at this time. However, the control by the microcomputer 11 should not be limited to such a manner. For example, in such a case, the microcomputer 11 may start the reproduction processing based on the reproduction information stored in the storage means at the time when a prescribed time has elapsed.

Further, in the embodiment described above, the plurality of information recording media to housed in the reproduction apparatus were a plurality of disks housed in the magazine. However, in accordance with the present invention, the format such as a DIN changer capable of housing the plurality of disks without using the magazine may be adopted.

Further, in the reproduction apparatus according to the invention, prior to the reproduction processing of a plurality of information recording media, on the basis of an instruction from the operating means, at the time of initial setting, as occasion demands, the user can determine the contents of the information data relative to the plurality of information media to be stored in a display data recording area of the RAM and those of the reproduction information of the plurality of information media to be stored in a reproduction information recording area.

Further, prior to the reproduction processing of the plurality of information media, on the basis of an instruction from the operating means, the user can freely select whether the control by the microcomputer should be made by FIG. 1 or FIG. 2.

In the embodiment described above, the user designates the position of the tray (tray No.) housed in the magazine to select the disk carried by the tray. However, in accordance with the present invention, the designated disk may be selected in such a manner that the microcomputer 11 detects the information (e.g. TOC (Table of Contents) information) for individually identifying the plurality of disks housed in the magazine.

What is claimed is:

1. A reproduction apparatus capable of selectively reproducing a prescribed information-recorded medium of a plurality of information-recorded media, comprising:

operating means for receiving a selection command for the prescribed information-recorded medium;

selecting means for selecting the prescribed information-recorded medium on the basis of the selection command;

first reproduction processing means for making reproduction processing of the information-recorded medium thus selected;

storage means for storing reproduction information, which comprises address information indicative of an address position of said prescribed information-recorded medium, of the information-recorded medium being reproduced; and control means for controlling said selecting means and said first reproduction processing means, wherein an operation by said selecting means is executed while said first reproduction processing means reproduces said prescribed information-recorded medium, if a selection command for said prescribed information-recorded medium is given again within a prescribed time by said operation, said control means instructs the selecting means to select the prescribed information-recorded medium again and instructs the first reproduction processing means to reproduce said prescribed information-recorded medium on the basis of the reproduction information stored in said storage means.

2. A reproduction apparatus according to claim 1, further comprising:

second reproduction processing means for reproducing prescribed information different from said first reproduction processing means and switching means for switching between said first reproduction processing means and said second reproduction processing means, wherein a switching operation is made by said switching means is executed while said first reproduction processing means reproduces said prescribed information-recorded medium, if said first reproduction processing means is selected again within a prescribed time by said switching operation, said control means instructs said selecting means to select said prescribed information-recorded medium again and instructs the second reproduction processing means to reproduce said prescribed information-recorded medium on the basis of the reproduction information stored in said storage means.

3. An reproduction apparatus according to claim 1, further comprising:

detecting means for detecting ON/OFF of a power source, wherein where OFF of the power source is detected by said detecting means while said first reproduction processing means reproduces said prescribed information-recorded medium, if ON of the power source is detected again within a prescribed time, said control means instructs said selecting means to select said prescribed information-recorded medium again and instructs said first reproduction processing means to reproduce said prescribed information-recorded medium on the basis of the reproduction information stored in said storage means.

4. A reproduction apparatus according to claim 1, wherein the reproduction information stored in said storage means is address information indicative of a leading address position a predetermined group of said information-recorded media.

5. A reproduction apparatus capable of selectively reproducing a prescribed information-recorded medium of a plurality of information-recorded media, comprising:

operating means for receiving a selection command for the prescribed information-recorded medium;

selecting means for selecting the prescribed information-recorded medium on the basis of the selection command;

first reproduction processing means for making reproduction processing of the information-recorded medium thus selected;

storage means for storing reproduction information, which comprises address information indicative of an address position of said prescribed information-recorded medium, of the information-recorded medium being reproduced; and control means for controlling said selecting means and said first reproduction processing means, wherein an operation by said selecting means is executed while said first reproduction processing means reproduces said prescribed information-recorded medium, if a selection command for said prescribed information-recorded medium is given again within a prescribed time by said operation, said control means externally informs whether or not said prescribed information-recorded medium should be reproduced on the basis of the reproduction information stored in said storage means.

6. A reproduction apparatus according to claim 5, further comprising:

second reproduction processing means for reproducing prescribed information different from said first reproducing means and switching means for switching between said first reproduction processing means and said second reproduction processing means, wherein a switching operation is made by said switching means is executed while said first reproduction processing means reproduced said prescribed information-recorded medium, if said first reproduction production processing means is selected again within a prescribed time by said switching operation, said control means informs externally to said reproduction apparatus whether or not the prescribed information-recorded medium should be reproduced on the basis of the reproduction information stored in said storage means.

7. An reproduction apparatus according to claim 6, further comprising:

detecting means for detecting ON/OFF of a power source, wherein where OFF of the power source is detected by said detecting means while said first reproduction processing means reproduces said prescribed information-recorded medium, if ON of the power source is detected again within a prescribed time, said control means informs externally to said reproduction apparatus whether or not said prescribed information-recorded medium should be reproduced on the basis of the reproduction information stored in said storage means.

8. A reproduction apparatus according to claim 5, further comprising:

input means for inputting a selecting command of information informed externally to said reproduction apparatus, wherein where said input means selects to reproduce said prescribed information-recorded medium on the basis of the reproduction information stored in said storage means, said control means instructs said selecting means to select said prescribed information-recorded medium again and instructs said first reproduction processing means to reproduce said prescribed information-recorded medium on the basis of said reproduction information stored in said storage means.

9. A reproduction apparatus according to claim 8, wherein where said input means selects to not reproduce said prescribed information-recorded medium on the basis of said reproduction information stored in said storage means, said control means instructs said selecting means to select said prescribed information-recorded medium again and instructs said first reproduction processing means to make normal reproduction processing.

10. A reproduction apparatus according to claim 5, wherein said reproduction information stored in said storage means is address information indicative of an address position of said prescribed information-recorded medium.

11. A reproduction apparatus according to claim 5, wherein said reproduction information stored in said storage means is address information indicative of a leading address position of a predetermined group of said information-recorded media.

12. A reproduction device capable of selectively reproducing a prescribed information-recorded medium of a plurality of information-recorded media, comprising:

an operation panel that receives a selection command for the prescribed information-recorded medium;

a selection circuit that selects the prescribed information-recorded medium on the basis of the selection command;

a first reproduction processing circuit that makes reproduction processing of the information-recorded medium thus selected;

memory that stores reproduction information, which comprises address information indicative of an address position of said prescribed information-recorded medium, of the information-recorded medium being reproduced; and a control processor that controls said selection circuit and said first reproduction processing circuit, wherein an operation by said selection circuit is executed while said first reproduction processing circuit reproduces said prescribed information-recorded medium, if a selection command for said prescribed information-recorded medium is given again within a prescribed time by said operation, said control processor instructs the selection circuit to select the prescribed information-recorded medium again and instructs the first reproduction processing circuit to reproduce said prescribed information-recorded medium on the basis of the reproduction information stored in said memory.

13. A reproduction device according to claim 12, further comprising:
a second reproduction processing circuit that reproduces prescribed information different from said first reproduction processing circuit and a switching circuit for switching between said first reproduction processing circuit and said second reproduction processing circuit, wherein a switching operation is made by said switching circuit is executed while said first reproduction processing circuit reproduces said prescribed information-recorded medium, if said first reproduction processing circuit is selected again within a prescribed time by said switching operation, said control processor instructs said selecting circuit to select said prescribed information-recorded medium again and instructs the second reproduction processing circuit to reproduce said prescribed information-recorded medium on the basis of the reproduction information stored in said memory.

14. A reproduction device capable of selectively reproducing a prescribed information-recorded medium of a plurality of information-recorded media, comprising:
an operation panel that receives a selection command for the prescribed information-recorded medium;
a selection circuit that selects the prescribed information-recorded medium on the basis of the selection command;
first reproduction processing circuit that makes reproduction processing of the information-recorded medium thus selected;
memory that stores reproduction information, which comprises address information indicative of an address position of said prescribed information-recorded medium, of the information-recorded medium being reproduced; and
a control processor that controls said selection circuit and said first reproduction processing circuit, wherein an operation by said selecting circuit is executed while said first reproduction processing circuit reproduces said prescribed information-recorded medium, if a selection command for said prescribed information-recorded medium is given again within a prescribed time by said operation, said control processor externally informs whether or not said prescribed information-recorded medium should be reproduced on the basis of the reproduction information stored in said memory.

15. A reproduction device according to claim 14, further comprising:
a detecting circuit that detects ON/OFF of a power source, wherein OFF of the power source is detected by said detecting circuit while said first reproducing processing circuit reproduces said prescribed information-recorded medium, if ON of the power source is detected again within a prescribed time, said control processor informs externally to said reproduction device whether or not said prescribed information-recorded medium should be reproduced on the basis of the reproduction information stored in said memory.

16. A method of operating a reproduction device for selectively reproducing a prescribed information of a plurality of information-recorded media, comprising:
receiving a selection command for the prescribed information-recorded information;
selecting the prescribed information-recorded medium based on the selection command;
reproducing by a first reproducing circuit the information-recorded medium selected;
storing reproduction information in a memory, which comprises address information indicative of an address position of said prescribed information-recorded medium, of the information-recorded medium being reproduced; and
controlling the selecting and reproducing of the information-recorded medium, wherein an operation of selecting is executed while reproducing said prescribed information-recorded medium, if a selection command for said prescribed information-recorded medium is given again with a prescribed time by said operation, then controlling the selecting and controlling the reproducing of the prescribed information-recorded medium on the basis of the reproduction information stored in said memory.

17. A method according to claim 16, further comprising:
a second reproducing circuit;
wherein a switching operation is made when switching is executed while said first reproducing circuit is reproducing said prescribed information-recorded medium, and if said first reproducing circuit is selected again within a prescribed time by said switching operation, and
controlling the selecting to select said prescribed information-recorded medium again and controlling the second reproducing circuit to reproduce said prescribed information-recorded medium on the basis of the reproduction information stored in said memory.

18. A method of operating a reproduction device for selectively reproducing a prescribed information of a plurality of information-recorded media, comprising:
receiving a selection command for the prescribed information-recorded information;
selecting the prescribed information-recorded medium based on the selection command;
reproducing by said first reproducing circuit the information-recorded medium selected;
storing reproduction information in a memory, which is address information indicative of an address position of said prescribed information-recorded medium, of the information-recorded medium being reproduced;
controlling the selecting and reproducing, wherein an operation of selecting is executed while reproducing said prescribed information-recorded medium, if a selection command for said prescribed information-recorded medium is given again within a prescribed time by said operation, and
informing externally whether or not said prescribed information-recorded medium should be reproduced on the basis of the reproduction information stored in said memory.

19. A method according to claim 18, further comprising:
detecting ON/OFF of a power source, wherein OFF of the power source is detected while said first reproducing processing circuit reproduces said prescribed information-recorded medium, if ON of the power source is detected again within a prescribed time,
informing externally to said reproduction device whether or not said prescribed information-recorded medium should be reproduced on the basis of the reproduction information stored in said memory.

* * * * *